United States Patent

[11] 3,628,159

[72] Inventor Richard John Godwin Ellis
Cambridge, England

[21] Appl. No. 864,653
[22] Filed Oct. 8, 1969
[45] Patented Dec. 14, 1971
[73] Assignee Pye Limited
[32] Priority Oct. 10, 1968
[33] Great Britain
[31] 48,056/68

[54] LOCKING OF TELEVISION SYNCHRONISM GENERATORS
7 Claims, 1 Drawing Fig.

[52] U.S. Cl. 328/134, 328/141, 328/155, 328/127, 178/69.5 TV
[51] Int. Cl. H03b 3/06, H04n 5/04
[50] Field of Search 178/69.5 TV, 5.4 CD; 331/20; 307/232; 328/127, 133, 134, 141, 155

[56] References Cited

UNITED STATES PATENTS

| | | | |
|---|---|---|---|
| 3,182,128 | 5/1965 | Legler | 178/69.5 |
| 3,209,278 | 9/1965 | Binkis | 331/20 |
| 3,223,942 | 12/1965 | Smeulers | 331/20 |
| 3,334,182 | 8/1967 | Legler | 178/69.5 |

*Primary Examiner*—Richard Murray
*Assistant Examiner*—Peter M. Pecori
*Attorney*—Frank R. Trifari ABSTRACT: A circuit for synchronizing a local television synchronizing oscillator with a remote one has a second phase discriminator coupled to receive the local and remote synchronizing signals. It generates an output voltage that is applied to a varicap of an integrating circuit that receives the local sync signal so that the time constant varies with phase difference of the signals. A first phase discriminator receives the remote sync signal and the integrated local sync signal and applies a control voltage to the local oscillator for synchronizing it with the remote oscillator.

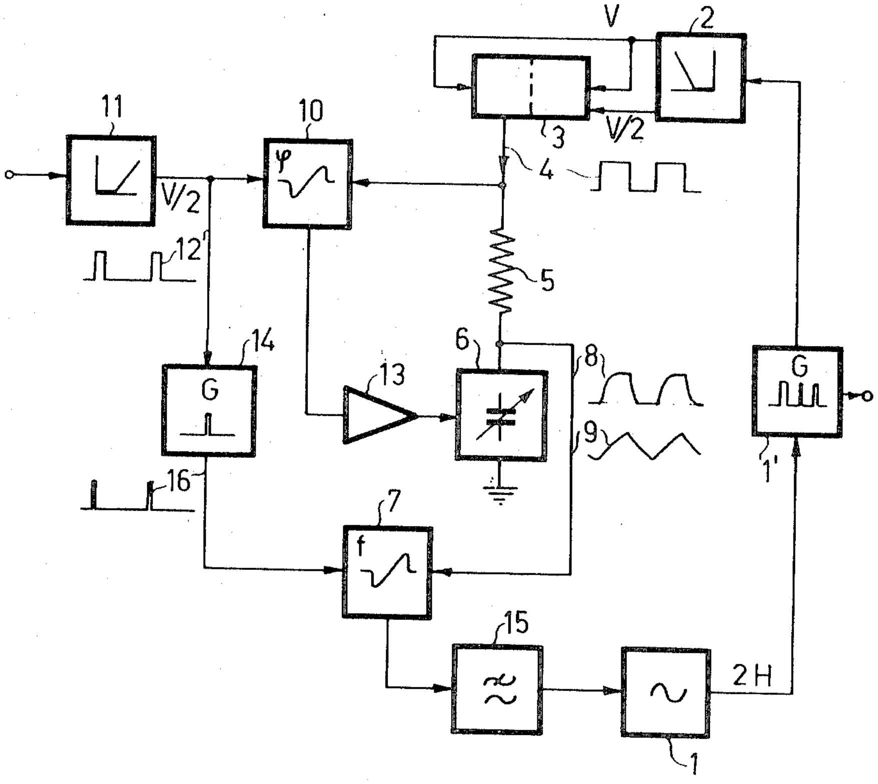
INVENTOR.
RICHARD J. G. ELLIS
BY
AGENT

LOCKING OF TELEVISION SYNCHRONISM GENERATORS

The present invention relates to a synchronizing arrangement for causing an oscillator to run in step with incoming synchronizing pulses. The arrangement is particularly suitable for locking the vertical synchronizing waveform of a television transmitting station, hereinafter called the local station, to the waveform received from a remote camera having its own waveform generator.

A known method of field locking is to separate from the incoming remote video signal the vertical synchronizing pulses (remote V-pulses). The leading edges of the remote V-pulses are employed to trigger a pulse generator which produces a train of narrow pulses in phase with the remote V-pulses, and which are applied to a first input of a discriminator circuit.

The local vertical synchronizing signals are separated from the local combined synchronizing waveform and employed to trigger a pulse generator which produces a waveform having ramp-type edges, and which is applied to the second input of the discriminator.

The output voltage from the discriminator depends on the location of the narrow pulses on the ramp waveform, and is fed to a voltage dependent element, such as a varactor, in the frequency-determining circuit of the oscillator which drives the local waveform generator, thereby controlling the oscillator frequency in such a manner that the remote pulses occur at a chosen point on the ramp. The oscillator is thus locked to the remote synchronizing pulses.

It is apparent that for accurate phasing of the local and remote signals, the ramp waveform should be steep, so that small changes in the relative phase of the local and remote synchronizing signals produce large changes in discriminator output. However, in order to provide a wide pull-in range, the slope of the ramp must be small so that the ramp waveform approximates to a sawtooth extending over the interval between successive local synchronizing pulses.

It is an object of the present invention to reconcile these conflicting requirements by providing means whereby the steepness of the ramp waveform is caused to vary, dependent on the phase difference between the local and remote signals.

The present invention provides a synchronizing arrangement for an oscillator in which a signal derived from the oscillator is applied to an integrator having a variable time constant to produce a modified derived signal, the modified signal being applied to the first input of a first discriminator to the second input of which is applied a synchronizing signal, the output of the first discriminator providing the frequency and phase control for the oscillator, the signal derived from the oscillator being additionally applied to the first input of a second discriminator to the second input of which is applied the synchronizing signal, the output of the second discriminator controlling the time constant of the integrator such that a large or small difference between the signals applied to the second discriminator causes the time constant of the integrator to be respectively long or short.

The signal derived from the oscillator may be a square wave in which case the modified derived signal produced by the integrator will be a ramp waveform, the slope of the ramp being steeper when the time constant of the integrator is short as compared with its slope when the time constant is long.

The integrator may be formed by a resistor and a voltage-dependent capacitor, the output of the second discriminator being a variable voltage which controls the capacity of the voltage-dependent capacitor. The signal applied to the integrator may be derived from the oscillator through a bistable trigger circuit, while the synchronizing signal may be applied to the second input of the first discriminator through a pulse generator which provides pulses of narrower width than those applied to the second input of the second discriminator.

Where the synchronizing arrangement is incorporated in a television transmission system, the oscillator to be synchronized may be included in the local waveform generator while the synchronizing signal may be derived from a remote combined synchronizing signal. In such a case the signal derived from the oscillator and the synchronizing signal may both be at picture frequency.

The invention also provides a television transmission arrangement incorporating a synchronizing arrangement for an oscillator according to the invention.

Further details of the invention and the manner in which it is to be carried out will become apparent from the following description of a preferred embodiment, with reference to the attached drawing.

The embodiment described is for use in a television system employing interlaced fields such as the British and European standards employing 50 fields per second interlaced to give 25 pictures per second. Locking is carried out at picture frequency, to ensure correspondence of the even and odd fields of the local and remote signals.

An oscillator 1 operating at twice line frequency (2H) drives a local waveform generator (not shown) which provides all synchronizing and blanking waveforms required for the control of the local cameras and the transmitter. The local combined (horizontal and vertical) synchronizing waveform produced by the waveform generator is applied to a local vertical sync separator 2 which is of a type capable of producing output signals both at field frequency (50 Hz.) and at picture frequency (25 Hz.) for example of the type described in our copending U.S. application Ser. No. 853,667, filed Aug. 28, 1969.

The 50 Hz. local V-signal from sync separator 2 is applied to both inputs of a bistable 3, while the 25 Hz. local picture frequency signal is employed to reset bistable 3. The output of bistable 3 is a square wave of frequency 25 Hz. with its positive-going edges synchronous with the leading edges of the local picture frequency synchronizing signal. The output of bistable 3 is illustrated as waveform 4.

Between the output of bistable 3 and ground is connected an integrating circuit comprising a resistor 5 and a variable capacitor 6 in series. The junction of resistor 5 and capacitor 6 is connected to a first input of a phase discriminator 7. The waveform appearing at the first input of discriminator 7 depends on the values R and C of resistor 5, and capacitor 6, which are chosen such that when C has its maximum value, a sawtooth waveform 9 is produced, while for smaller values of C, the waveform 8 is a modified square wave with positive and negative ramps, the steepness of the ramps increasing with decreasing values of C.

Capacitor 6 is of a type, such as a varactor, in which the capacitance depends on the value of a control potential, which is derived from a phase discriminator 10.

The combined video and synchronizing signal from the remote station is fed to a remote sync separator 11, which is preferably of the form described in our said copending application. The output at picture frequency (waveform 12) is connected to a first input and the square wave output from bistable 3 (waveform 4) is connected to a second input of discriminator 10. The output from discriminator 10 is a potential depending on the phase difference between these waveforms, i.e., on the time interval between corresponding edges.

The output potential from discriminator 10 is applied to input of an amplifier 13 and the amplified signal is connected to the control input of capacitor 6. Thus when the phase difference between the remote and local signals is large, the output from discriminator 10 is also large, and the value C of capacitor 6 is a maximum, producing the sawtooth waveform 9. When the remote and local signals are in phase the output from discriminator 10 is zero and the value of C is a minimum, producing a waveform such as 8, with steep ramps.

The picture frequency output of remote sync separator 11 is also connected to a pulse generator 14, which is triggered by the leading edges of the pulses at picture frequency, and produces narrow pulses 16 (e.g., 2 μsec.) which are applied to a second input of discriminator 7.

The output from discriminator 7, dependent on the position of the narrow pulses on the ramp, is fed via a low-pass filter 15 to control the frequency of oscillator 1 in the known manner.

Vertical synchronizing pulse separators of the type described in our said copending application are not essential to the invention. Locking at picture frequency can be achieved by employing sync separators providing local and remote vertical pulses at field frequency. These would be employed to drive respective divide by two circuits, giving local and remote picture frequency signals. The local picture frequency signal would then be employed to synchronize a square wave generator.

The invention is not confined to British and European television standards. It could equally be employed on 60 field systems, or on systems in which interlacing is not required. In the latter case, a square wave generator would be triggered by the output at field frequency from the local sync separator, and the remote sync separator would produce pulses at remote field frequency.

What I claim is:

1. A circuit comprising an oscillator; means for deriving a signal from said oscillator; integrating means coupled to said deriving means and having a variable time constant; a first phase discriminator having a first input coupled to said integrating means, a second input coupled to receive a remote synchronization signal, and an output coupled to said oscillator for frequency and phase control thereof; and a second phase discriminator having a first input coupled to receive said remote synchronization signal, a second input coupled to said deriving means, and an output coupled to said integrating means for controlling the time constant thereof as a function of the phase difference between the input signals of said second discriminator.

2. A circuit as claimed in claim 1 wherein said deriving means comprises means for producing a square wave and said integrating means produces a ramp waveform having a steeper slope when said time constant is short as compared to when it is long.

3. A circuit as claimed in claim 1 wherein said integrating means comprises a resistor and a voltage-variable capacitor coupled to said resistor; and said second discriminator output is coupled to said capacitor and produces a variable voltage that controls the capacity of said capacitor.

4. A circuit as claimed in claim 1 wherein said deriving means comprises a bistable trigger circuit.

5. A circuit as claimed in claim 4 wherein said trigger circuit comprises a set input, a reset input, and an output coupled to said second discriminator second input and said integrating means; and said deriving means further comprises a first synchronization separator having a field signal output coupled to both of said trigger circuit inputs, and a frame signal output coupled to said reset input.

6. A circuit as claimed in claim 1 further comprising a pulse generator having an input coupled to receive said remote synchronization signal and an output means coupled to said first discriminator second input for generating pulses having a shorter duration than that of said remote synchronization signal applied to said second discriminator first input.

7. A circuit as claimed in claim 6 further comprising a second synchronization separator having an input coupled to receive a remote video signal and an output means coupled to said pulse generator input and said second discriminator first input for producing said remote synchronization signal.

* * * * *